(12) United States Patent
Buettner et al.

(10) Patent No.: US 7,697,538 B2
(45) Date of Patent: Apr. 13, 2010

(54) DATA TRANSFER METHOD AND AUTOMATION SYSTEM USED IN SAID DATA TRANSFER METHOD

(75) Inventors: Holger Buettner, Berlin (DE); Jens Sachs, Petershagen (DE)

(73) Assignee: Beckhoff Automation GmbH, Verl (DE)

( * ) Notice: Subject to any disclaimer, the term of this patent is extended or adjusted under 35 U.S.C. 154(b) by 598 days.

(21) Appl. No.: 11/717,613

(22) Filed: Mar. 13, 2007

(65) Prior Publication Data

US 2007/0242614 A1 Oct. 18, 2007

Related U.S. Application Data

(63) Continuation of application No. PCT/EP2005/010020, filed on Sep. 16, 2005.

(30) Foreign Application Priority Data

| Sep. 16, 2004 | (DE) | ........................ 10 2004 044 764 |
| Mar. 1, 2005 | (DE) | ........................ 10 2005 009 224 |

(51) Int. Cl.
*H04L 12/56* (2006.01)
(52) U.S. Cl. ....................................... 370/394; 714/746
(58) Field of Classification Search ........................ None
See application file for complete search history.

(56) References Cited

U.S. PATENT DOCUMENTS

| 6,609,226 | B1 | 8/2003 | Figueira |
| 2002/0159434 | A1* | 10/2002 | Gosior et al. ............... 370/350 |
| 2005/0120079 | A1* | 6/2005 | Anderson et al. ........... 709/203 |
| 2006/0069792 | A1* | 3/2006 | Pinkerton et al. ........... 709/230 |
| 2008/0187296 | A1* | 8/2008 | Park et al. ................... 386/124 |

FOREIGN PATENT DOCUMENTS

| DE | 693 24 050 T2 | 9/1999 |
| EP | 0 898 395 A2 | 2/1999 |
| WO | 99/49373 A1 | 9/1999 |
| WO | 02/35761 A3 | 5/2002 |

* cited by examiner

*Primary Examiner*—Ajit Patel
(74) *Attorney, Agent, or Firm*—David E. Bruhn; Dorsey & Whitney LLP

(57) ABSTRACT

A method transmits data packets on a data transmission link between two communication subscribers. The data packets respectively contain a check character which is calculated from the other data in the data packet. One communication subscriber uses the check character from the last data packet received by the other communication subscriber as start value for calculating the check character for a subsequent data packet which is to be sent to the other communication subscriber.

48 Claims, 6 Drawing Sheets

DATA TRANSFER METHOD AND AUTOMATION SYSTEM USED IN SAID DATA TRANSFER METHOD

CROSS-REFERENCE TO RELATED APPLICATION(S)

This application is a continuation of International Patent Application No. PCT/EP2005/010020, filed on Sep. 16, 2005, which claims priority to German Application No. 10 2004 044 764.0, filed on Sep. 16, 2004 and German Application No. 10 2005 009 224.1, filed Mar. 1, 2005, the contents of which are hereby incorporated in their entirety by reference herein.

BACKGROUND OF THE INVENTION

1. Field of the Invention

The invention relates to a method of transmitting data packets on a data transmission link between two communication subscribers and to an automation system having two communication subscribers which are connected via a data transmission link and which respectively have an interface unit.

2. Description of the Related Art

In automation systems for controlling machines, the assurance must be given that even if the automation system fails there is no risk to humans and the environment. Automation systems therefore normally operate on the basis of what is known as the failsafe principle, according to which the automation system changes to a safe state in the event of important components failing. Fundamental demands on the automation system when executing safety-related control functions on the basis of the failsafe principle are in this case that the process data from the machine sensors are processed in current and uncorrupted form during execution of the safety control functions and that a safe process state is always indicated to the machine actuators.

In the case of automation systems, however, the number of safety-related control functions is normally much lower than the number of non-safety-related control functions which are used for maintaining normal operation in the automation system. To ensure that the functionality of safety-related control functions is not influenced by the non-safety-related control functions in the automation system, the safety-related control functions are conventionally combined in a standalone safety program which is isolated from the non-safety-related control functions.

Complete isolation of safety-related and non-safety-related control functions is achieved if the safety program is executed on a standalone automation computer, which is often also connected to the emergency off switches, light barriers and other components ensuring machine safety by means of dedicated wiring. To reduce this additional hardware complexity through an additional automation computer in the automation system, automation systems are already known in which a safety program and a non-safety-related control program are implemented on the same hardware components by extending the non-safety-related control program by what is known as a safety layer.

Modern automation systems are normally of a decentralized design, with the process peripherals, i.e. the sensor and actuator levels, communicating with the control computers via local area networks, preferably a field bus system. For the purpose of machine control, the control computers read in the input signals for the control programs via the field bus from the process peripherals and, following real-time processing by the control computer, output the output signals to the process peripherals via the field bus. To be able to use the field bus in the automation system for simultaneously also transmitting process signals from a safety program, the field bus system is expanded by what is known as a safety layer, which minimizes the probability of a fault corrupting the transmission of the data between the process peripherals and the control computers such that this corruption is no longer identified to an admissible minimum degree, so that the field bus can also be used for transmitting safety-related data.

Such additional safety layers in field bus systems normally contain an additional address relationship between the two communication subscribers on the field bus, in order to allow a distinct association. In addition, the safety-related data packet transmitted between the communication subscribers is provided with an additional check character which is calculated from the transmitted process data and addresses, in order to be able to identify data corruption reliably. To be able to check the correct order of the safety-related process data which are to be transmitted and their prompt arrival at the communication subscribers, the safety-related data packet is also normally provided with a consecutive sequence number. In this context, the sequence number is normally taken from a prescribed numbering block which is then reset again after the complete pass.

A known automation system in which the control program and the safety program can be implemented on the same hardware components is the Simatic system from Siemens. In this case, the field bus system used is the Profibus system, which is expanded by what is known as a Profisafe protocol for transmitting safety-related data packets. However, the automation system with the safety program can be expanded only within the context of this precisely stipulated configuration and data processing environment.

In automation systems, however, the Ethernet protocol is increasingly being used besides the known proprietary field bus protocols in order to transmit process signals. The Ethernet protocol is the most widely used technology in office communication for transmitting data at high speeds in local area communication networks. On account of the advantages of the Ethernet concept when using standard hardware and software components and also the opportunity to achieve high data transmission rates with simple networking technology, Ethernet field bus systems are increasingly also being used in industrial production for data interchange between the actuator/sensor level and the control computers.

It would therefore also be desirable to be able to equip Ethernet field bus systems with a safety layer so as also to be able to execute safety programs on the Ethernet field bus besides conventional control programs. However, Ethernet networks are normally designed using "switches" in order to prevent data collisions on the network. Switches are data packet switching nodes with a plurality of inputs and outputs, where the data packet arriving at an input is switched through exclusively to the output which knows the receiver station. However, data packet switching using switches in an Ethernet network gives rise to time delays, since the data packet received by the switch at one input is buffer-stored and only then switched through to the desired output.

The delayed forwarding of the data packets in the Ethernet equipped with switches means that there is the risk with conventional safety layers, such as the Profisafe protocol, that an incorrect process state will arise. Since the safety data packets are provided with a consecutive sequence number from a numbering block with a prescribed number of numbers, the buffer-storage of the data packets in a switch means that the sequence number can overflow, which can then result in incorrect safety data being transmitted. In the case of the Profisafe protocol, for example, the safety data packets are transmitted with an 8-bit sequence number, i.e. a data packet in which the process data do not change is repeated every 255 cycles during data transmission in the automation system, since at that time the sequence number overflows, 0 being an impermissible sequence number. As a result, an emergency off switch cannot then be identified promptly or machine protection cannot be switched off promptly and hence it is not possible to ensure a safe process state for the machines in the automation system.

SUMMARY OF THE INVENTION

Various aspects of the present invention can provide particular advantages for a method of transmitting data packets on a data transmission link between two communication subscribers and for an automation system having two communication subscribers which are connected via a data transmission link and which respectively have an interface unit.

According to a first embodiment of the invention a method transmits data packets on a data transmission link between two communication subscribers. The data packets respectively contain a check character which is calculated from the other data in the data packet. One communication subscriber uses the check character from the last data packet received by the other communication subscriber as start value for calculating the check character for a subsequent data packet which is to be sent to the other communication subscriber.

According to a second embodiment of the invention a method transmits data packets on a data transmission link between two communication subscribers. The data packets respectively contain a check character which is calculated from the other data in the data packet. The calculation of the check character takes account of a sequence number which identifies the respective message sequence of the data transmission between the two communication subscribers.

According to a third embodiment of the invention a method transmits data packets on a data transmission link between two communication subscribers. The data packets transmitted between the two communication subscribers respectively contain a connection identifier.

According to a fourth embodiment of the invention an automation system has two communication subscribers which are connected via a data transmission link and which respectively have an interface unit. Each interface unit forms data packets with a check character calculated from the other data in the data packet, the start value for calculating the check character for a data packet which is to be sent to the other communication subscriber being the check character from the last data packet received by the other communication subscriber.

According to a fifth embodiment of the invention an automation system has two communication subscribers which are connected via a data transmission link and which respectively have an interface unit. Each interface unit forms data packets with a connection identifier.

BRIEF DESCRIPTION OF THE DRAWINGS

These above recited features of the present invention will become clear from the following description, taking in conjunction with the accompanying drawings. It is to be noted, however, that the accompanying drawings illustrate only typical embodiments of the present invention and are, therefore, not to be considered limiting of the scope of the invention. The present invention may admit other equally effective embodiments.

FIG. 3A shows an initialization data transmission, FIG. 3B shows a parameter data transmission and FIG. 3C shows a process data transmission.

DESCRIPTION OF THE PREFERRED EMBODIMENTS

Communication networks provide a simple way of interchanging and sharing data and/or resources between workstations, subsequently also called communication subscribers. In this context, the Ethernet concept is the most widely used communication standard in locally restricted communication networks. The Ethernet connects a plurality of communication subscribers to one another by means of a shared transmission medium, the data to be transmitted being encapsulated into what are known as data packets, subsequently also called messages, using a predetermined format. In this context, the Ethernet comprises three areas, the hardware, i.e. the transmission medium and the network interfaces of the communication subscribers, the set of protocols controlling the access via the transmission medium, and the Ethernet packet form. The communication subscribers can be connected in this context using any network topologies.

Figure 1:
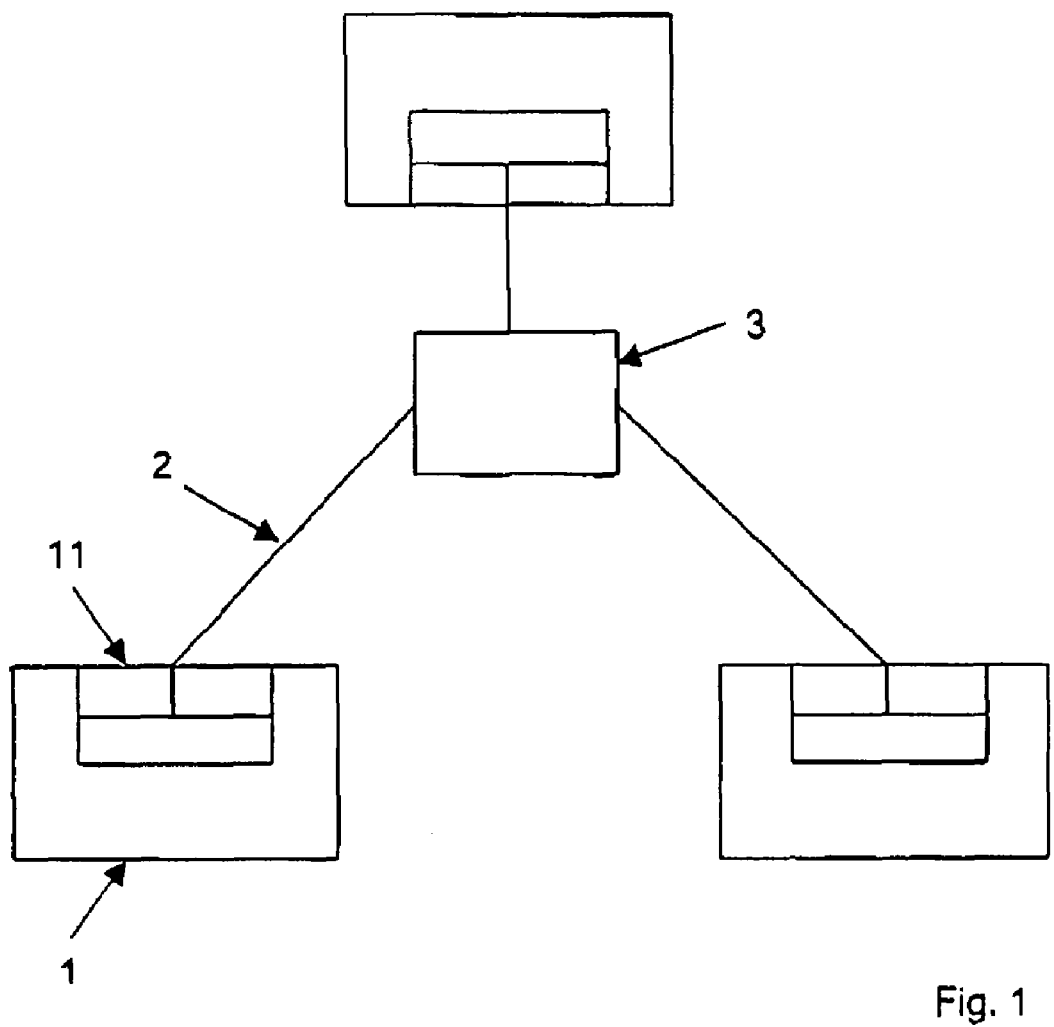
FIG. 1 shows the basic structure of an Ethernet-based automation system.

FIG. 1 shows a preferred network topology for an Ethernet. In this case, the communication subscribers 1 are connected to a central exchange 3, known as the switch, in a star shape by means of point-to-point connections 2. The switch 3 ensures that incoming data messages are switched through exclusively to the output to which the communication subscriber intended to receive the message is connected. The data messages are briefly buffer-stored in a switch in order to be able to be output to the correct output.

Each communication subscriber 1 has, as FIG. 1 shows, a network interface unit 11. The network interface unit 11 performs the encoding for the data which is to be transmitted and the decoding for the received data. In addition, the interface unit 11 also manages all control measures required for operating the network, i.e. the interface unit 11 performs management and data packet formation.

When using an Ethernet network, as shown in FIG. 1, as part of an automation system in which the communication subscribers are control computers and sensor/actuator machine systems, it is an important requirement besides real-time capability, i.e. the need for the control computers to output the process signals to the actuators within stipulated process times on account of the process signals captured by the sensors, to ensure that in the event of the automation system or an important component failing there is no threat to humans and the environment. The control computers in the automation system therefore need to execute not only normal control functions but also safety functions which ensure that in the event of an important component of the automation system failing there is provision made for the automation system to change automatically to a safe state on the basis of what is known as the failsafe principle, i.e. the connected machines are switched off in an emergency, for example.

The number of safety functions in a control program running on an automation system is normally lower than the number of noncritical control functions. When executing the safety functions, however, sound execution of the data transmission needs to be reliably granted. In particular, it is necessary to ensure that during transmission of safety-related data between the communication subscribers in the automation system there is minimum probability of a fault in the transmission corrupting the data such that this corruption is no longer identified.

To ensure that the functionality of safety-related control functions is not influenced by non-safety-related control functions in the automation computer, the network protocol used on the data transmission link needs to be provided with an additional safety layer which controls the data interchange for safety data between the communication subscribers in the automation system. To ensure safe transmission of data packets on a data transmission link between two communication subscribers within the context of the safety layer in the automation system, the invention provides each data packet with a check character which is calculated from the other data in the data packet, the interface unit 11 of the communication subscriber 1 using the check character from the last data packet received by the other communication subscriber as start value for calculating the check character for a subsequent data packet which is to be transmitted to the other communication subscriber.

The inventive practice in which the check character in a data packet is calculated using a dynamic start value by always using the check character from the previously received message as start value makes it possible to ensure that no identical data packets which could result in data corruption occur in a data transmission cycle. Identical data packets present a risk, particularly when using an Ethernet topology with a switch, as shown in FIG. 1, since in this case the data messages interchanged between the communication subscribers can be buffer-stored and then not forwarded to the addressee until a later time.

In the inventive method for data transmission, the communication subscriber receiving a data packet can also easily check whether the data packet is correct by calculating the check character for the received data packet and comparing it with the check character contained in the received data packet, the calculation taking the check character from the last data packet sent as start value. This is preferably done by the interface unit 11 of the communication subscriber 1. If there is a match between the calculated check character and the check character contained in the received data packet then the received data packet can be assessed as being correct.

Figure 2:
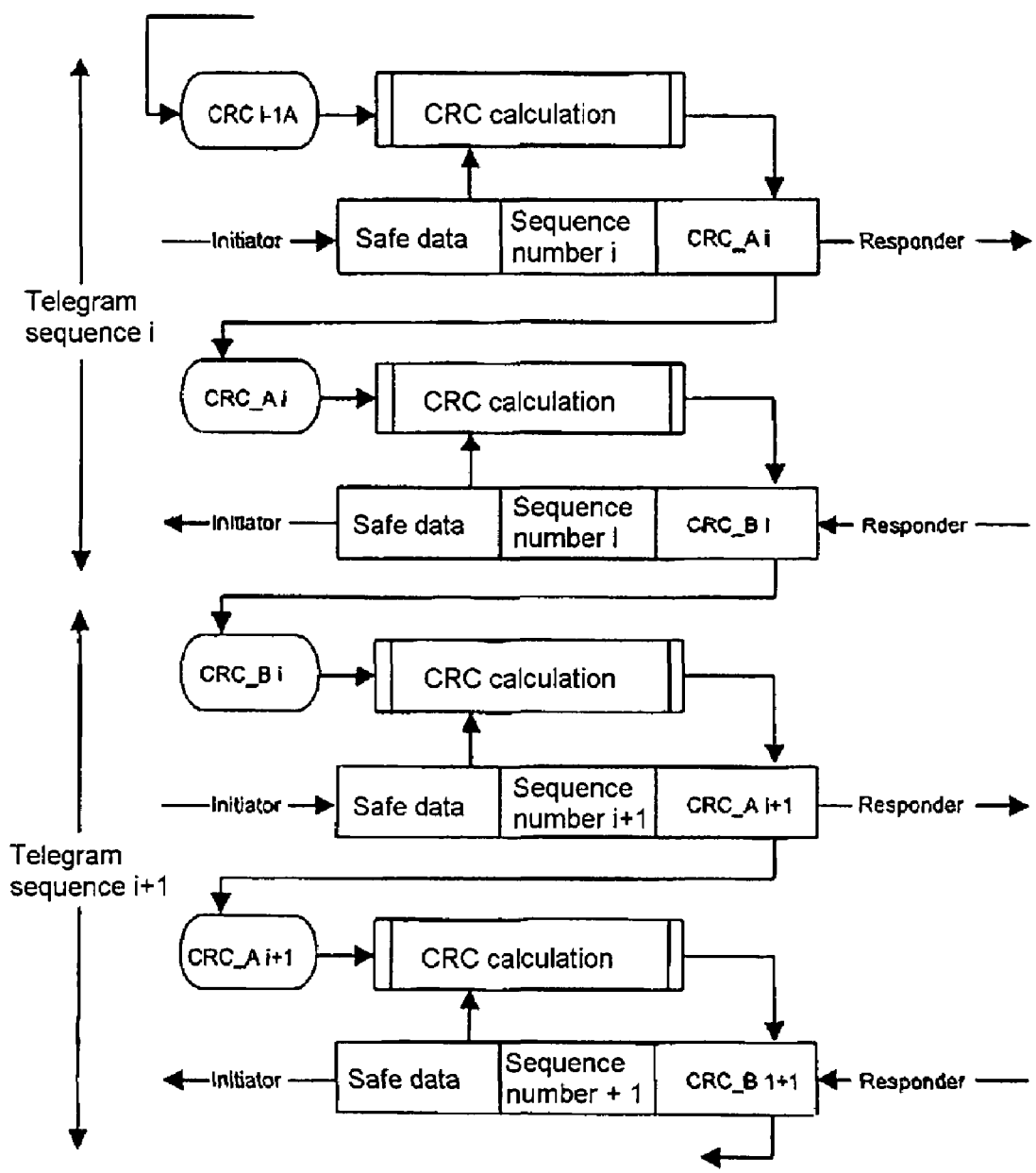
FIG. 2 shows a basic data flow and execution plan for an inventive safety layer with a first data packet form.

FIG. 2 shows a data flow and execution plan for the inventive method for data transmission between two communication subscribers. One communication subscriber in a data transmission, in the case of automation systems a control computer, appears as initiator of the data transmission in this case. A machine containing an actuator/sensor system in the automation system is the responder in the inventive data transmission. FIG. 2 shows two message sequences during data interchange between the initiator and the responder, each message sequence respectively being used to transmit a data packet from the initiator to the responder and from the responder back to the initiator. In this context, the data packets are made up of a useful data range, containing the safe data, i.e. the process signals required for the safety control, and a control data range, which in this case comprises a sequence number optionally and a check character imperatively.

The sequence number indicates what message sequence is involved in the data transmission within the context of safety program execution. The initiator uses its data packet sent to the responder to prescribe the sequence number, whereupon the responder returns the sequence number at the same time in the returned data packet. In the next message sequence, the sequence number is then increased by one in a sent data packet by the initiator.

During the data transmission based on the invention, however, it is fundamentally possible to dispense with transmitting a sequence number. This is because, to establish that uncorrupted data transmission has taken place, it is sufficient both in the initiator and in the responder to evaluate the check character from the received data packet. The check character is preferably a block protection character CRC (cyclic redundancy check) which can be used to identify errors in the data packet with a very high level of certainty. In this case, the CRC value is calculated from useful data and possibly also from the sequence number in the data packet, with the invention using the CRC value from the last received data packet as start value for the CRC calculation.

In the case of the data packet which is sent from the initiator to the responder in the message sequence i and which is shown in FIG. 2, the CRC value of the data packet to be sent is calculated using the CRC value from the last CRC value CRC_A i−1 received by the responder. The resultant CRC value in the sent data packet is CRC_A i. This CRC value is then used by the responder again as start value for the CRC calculation for the data packet returned to the initiator by the responder, with the CRC value obtained then being CRC_B i. This CRC value is then used in the next message sequence i+1 as start value for the CRC calculation by the initiator for the next data packet which is to be sent to the responder. The CRC value CRC_A i+1 is then again used for the CRC calculation for the data packet returned by the responder, the CRC value obtained being CRC_B i+1. Correct receipt of a data packet can easily always be established by the receiving communication subscriber by virtue of the CRC value for the received data packet being compared with a CRC value calculated on the basis of the stored start value.

Figure 3A:
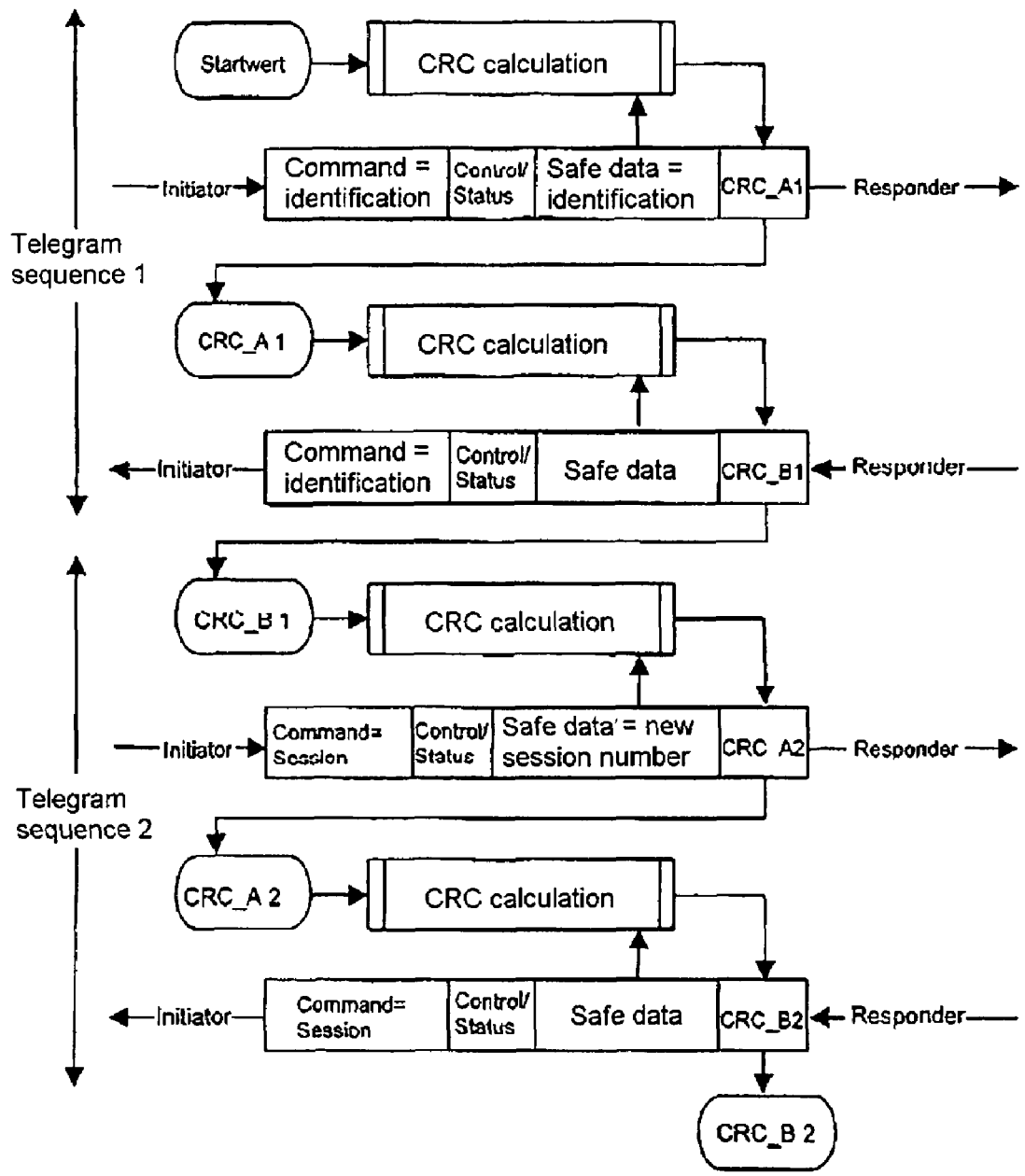
FIGS. 3A to 3C show an expanded data flow and execution plan for an inventive safety layer with a second data packet form, where

To continue to ensure, in line with the invention, that a safety program is started between the correct communication subscribers on the network, an initialization phase is carried out upon restart of the safety program or upon resumption following a break in communication, as shown in FIG. 3A. In this case, the data packet shown in FIG. 3A contains a command data field which indicates the meaning of the useful data in the data packet, e.g. whether the useful data are identification data or process data. Alternatively, however, the meaning of the useful data in the data packets of a data packet sequence for executing a safety program can also be made dependent on the order of the data packets. Thus, by way of example, it is possible to stipulate that the first two data items sent from the initiator to the responder always contain initialization data, and the other data packets then contain safe data. At the same time, it may also be stipulated that the responder only ever transmits process data to the initiator. The length of the data packets may in principle be fixed or variable. Besides the command data field, the data packet may also contain other data fields, e.g. a control/status field, as shown in FIG. 3A.

As FIG. 3A also shows, when the control program is restarted, the initiator sets up safe data communication by performing initialization using the first message sequence to send a data packet with the command data field identification and safe data allowing identification to the responder. In this case, the identification data packet is protected with a CRC value as a check character, whose start value is a firmly prescribed value, e.g. the device identifier for the responder. The identification data may be externally set address data which identify the two communication subscribers or else just the responder. They may also be device identifiers and/or serial numbers for the initiator or responder.

The responder, which knows the start value for the CRC calculation for the received first data packet, checks the CRC value CRC_A 1 from the received first data packet from the initiator in order to establish whether correct data transmission has taken place. The responder then takes the CRC value CRC_A 1 from the first data packet from the initiator as start value for the CRC calculation CRC_B 1 for the data packet which is to be returned to the initiator. This returned data packet preferably uses the same identifier as a command as is contained in a command data part of the identification data packet transmitted by the initiator in order to indicate that it is the returned data packet from the first message sequence. The data packet returned from the responder to the initiator in the first message sequence is then checked for correct data transmission by the initiator by calculating the CRC sum which is to be expected on the basis of the known start value CRC_A 1 and comparing it with the CRC sum CRC_B 1 from the received data packet.

In a second message sequence, the initiator then sends a further initialization data packet to the responder, said initialization data packet containing a session number as command session and as safe data. The CRC value CRC_A 2 from this second data packet is calculated using the CRC value CRC_B 1 from the data packet returned by the responder. The transmitted session number can in this case be generated randomly or on the basis of a prescribed algorithm and is intended to ensure that following a break in the communication link no further data packets from the previous data transmission are transmitted and identified.

The responder, which knows the start value CRC_B 1 for the CRC calculation for the data packet sent by the initiator, checks the received session data packet by calculating the CRC value which is to be expected on the basis of the known start value and then in turn takes the CRC value CRC_A 2 as start value for a second data packet which is to be sent to the initiator, which data packet can optionally be used to transmit safe data. In the case of this second returned data packet, the command used is preferably the command Session from the received data packet from the initiator.

Figure 3B:
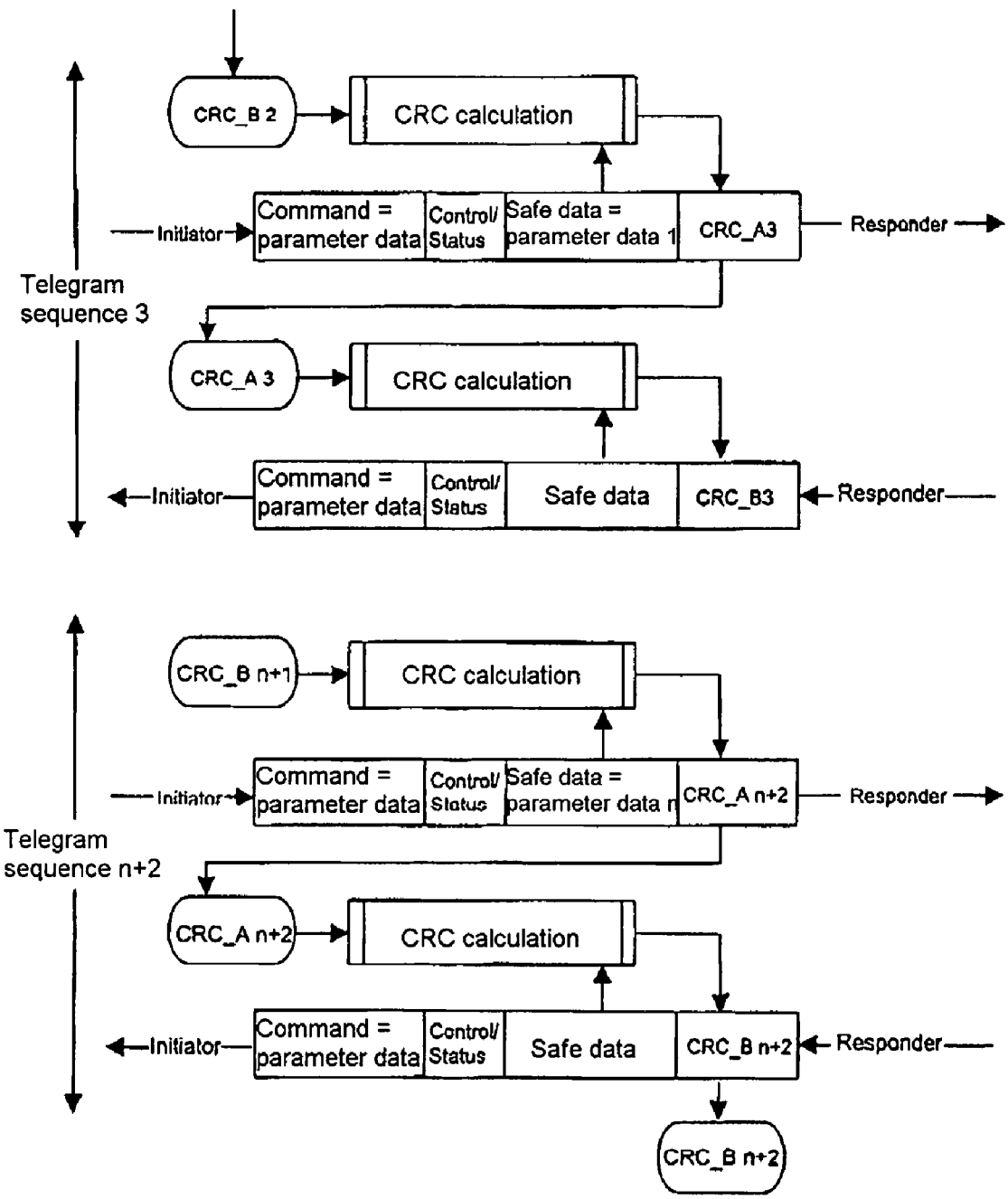

When the safe communication link has been set up, the initiator can then optionally also transmit safe parameter data, required for operating the responder, from the initiator to the responder. FIG. 3B shows two such message sequences, message sequence 3, which follows the transmission of the session data packet, and the last executed message sequence with parameter data.

To transmit the data packets with the parameter data, the initiator takes the last received CRC value CRC_B 2 as start value for the CRC calculation for the first parameter data packet, which it also provides with the command Parameter data and with safe data Parameter 1. The responder checks the CRC value CRC_A 3 from the received data packet and takes this CRC value as start value for a CRC calculation for the response data packet to the initiator. In this way, it is possible to transmit any number of safe parameter data to the responder. In the example shown in FIG. 3B, message sequences with safe parameter data are transmitted from the initiator to the responder. The responder uses the response data packets to transmit always optionally safe data, the command used in the response data packets being Parameter data.

Figure 3C:
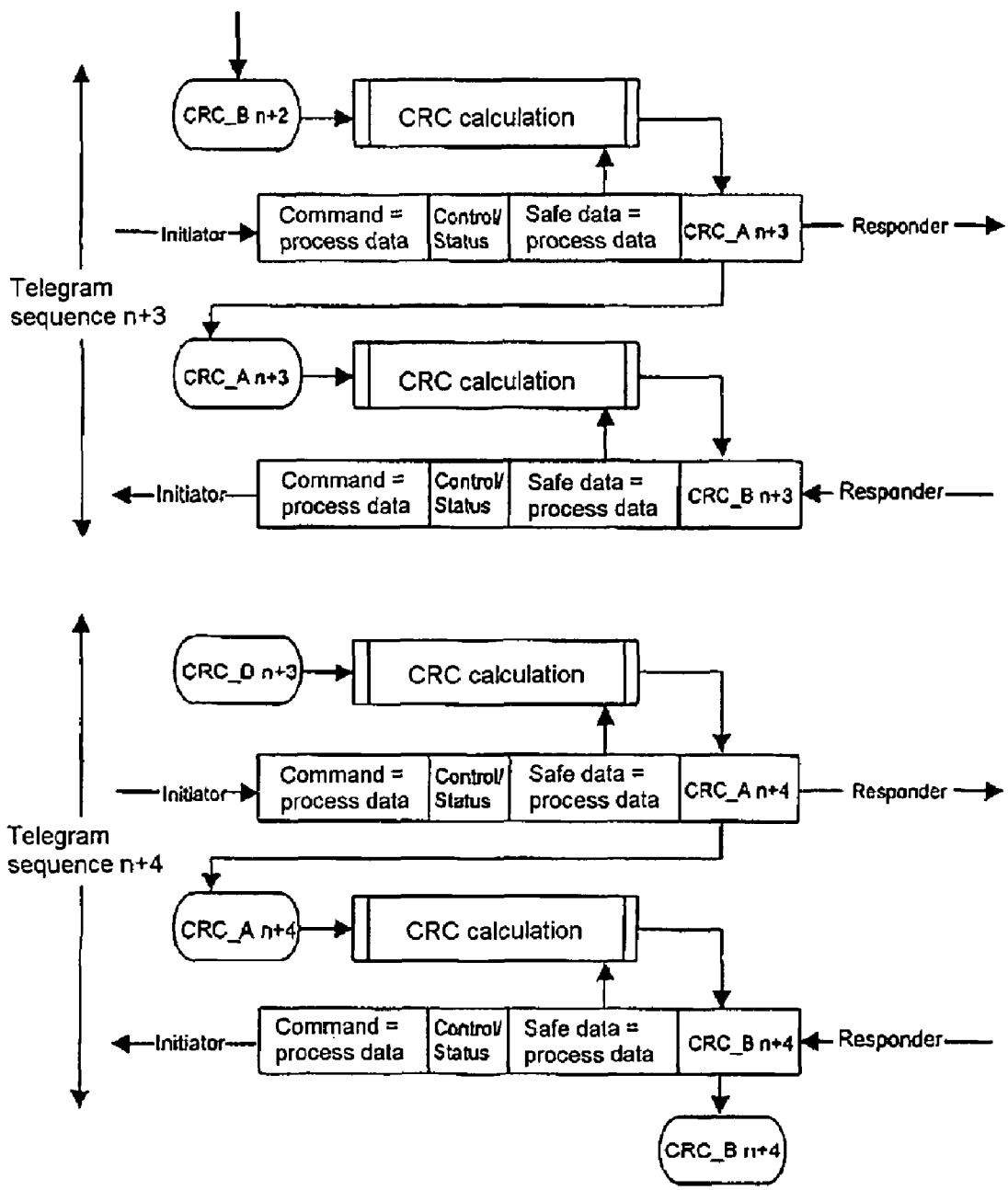

When parameter transmission has concluded, the initiator carries out process data transmission, as FIG. 3C shows. To this end, the data packets are provided with the command Process data and with the safe data Process data by the initiator and are protected using a CRC sum CRC_A n+3 which is calculated using the CRC value CRC_B n+2 as start value, which was transmitted in the last parameter data response from the responder to the initiator. The responder in turn sends the process data in its response data packet protected with this CRC sum CRC_B n+3, which is calculated using the CRC sum CRC_A n+3 transferred by the initiator as start value.

Figure 4:
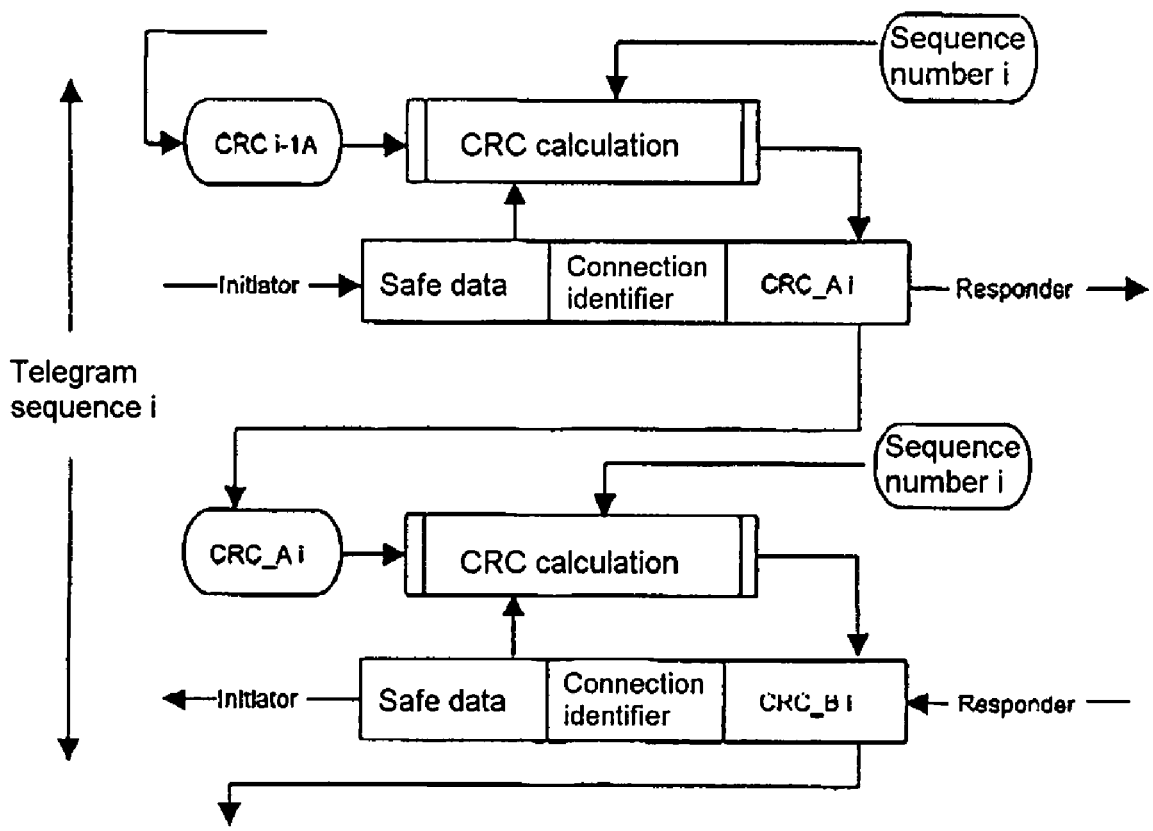
FIG. 4 shows another basic data flow and execution plan for an inventive safety layer with a third data packet form.

FIG. 4 shows another data flow and execution plan for an inventive method for data transmission between two communication subscribers. In this case, the data flow and execution plan corresponds essentially to the data flow and execution plan shown in FIG. 2. In contrast to the data packet shown in FIG. 2, however, the data packet is always additionally used to transmit a connection identifier at the same time, as is already transferred in FIG. 3A in the initialization phase in the command data part within the context of the identification data packet. In this case, in a similar manner to the identification data, the connection identifier may be an externally set address which identifies the two communication subscribers or else just the responder, as in FIG. 3. It may in turn also be device identifiers and/or serial numbers for the initiator or responder. Transmitting the connection identifier reliably ensures that if the initiator carries out safety-related data transmission with a plurality of responders at the same time, a coincidentally identical check character for the data packets contained by the various responders does not give rise to any confusion of the data packets.

In addition, the data flow shown in FIG. 4 always includes the sequence number of the calculation for the check character from the respective communication subscribers at the same time. However, this sequence number is not transmitted at the same time, but rather is generated by the communication subscribers independently on the basis of the same scheme. In this context, the sequence number may be automatically incremented, for example following initialization, or may be taken from a firmly prescribed numbering block. The fact that the sequence number is not transmitted at the same time means that the data packet length is not unnecessarily extended either. At the same time, the sequence number generated by the communication subscribers may be chosen to be of any length in order to prevent an overflow reliably. The inclusion of the sequence number in the calculation of the check character ensures that if the data packets do not change from one message sequence to the next there is nevertheless a change in the check character, and this ensures that an unwanted false alarm is not triggered.

The inventive practice of, during the transmission of data packets, providing the data packets with check characters which are calculated using the check character from the last data packet received by the other communication subscriber as start value provides the opportunity for reliably achieving safe data transmission in simple fashion, as is demanded for a safety layer in an automation system. In particular, it is then possible to use the Ethernet protocol as network protocol and to use a network structure with switches which buffer-stores the data packets, since the invention prevents data packets from being repeated within the execution of a safety program.

In line with the invention, the data transmission is also carried out such that first of all initialization with an identification number transmission and a session number transmission is carried out, which prevents any data packet repetition from being able to arise upon a restart. In addition, it is possible for the inventive data transmission also to involve the transmission of operating parameters which are required for the device functionality of the responder in the automation system.

The present invention provides a method of transmitting data packets on a data transmission link between two communication subscribers and an associated automation system, which data transmission link ensures that process signals for executing safety-related control functions are processed in current and uncorrupted form and a safe process state is always indicated to the actuators in the automation system.

In line with the invention, data packets are transmitted on a data transmission link between two communication subscribers in an automation system by providing each data packet with a check character which is calculated from the other data in the data packet, the start value used for calculating the check character for a data packet which is to be sent to the other communication subscriber being the check character from the last data packet received by the other communication subscriber.

The control programs are expanded with a safety layer, which ensures transmission of safety-related data, even in the case of automation systems whose data transmission is executed using an Ethernet field bus, which may also contain switches as data packet switching nodes. This is because adopting the check character contained in the last received data packet as start value for calculating the check character for the next data packet which is to be sent prevents the data packets from being able to be repeated identically in a data packet sequence, as in the case of the Profisafe protocol. There is therefore no risk of data packets not being identified correctly on account of transpositions when the data packets are buffer-stored by switches in the Ethernet network, for example, during the data transmission. The inventive continuous dynamic generation of the check characters means that no identical data packets arise within a data packet sequence.

In line with the invention, the correctness of a data packet received by a communication subscriber is checked by calculating the check character for the received data packet and comparing it with the check character contained in the received data packet, the calculation being performed by taking the check character from the last data packet sent as start value. With this interpretation of the safety layer, it is possible to dispense with the use of sequence numbers in the safety data packets, as are required in the case of the Profisafe protocol, in order to identify a correct data packet sequence. This is because the correct data packet sequence can be derived by the inventive communication subscriber directly from the transmitted check characters by determining the check character's start value which is in turn available to the receiving communication subscriber.

In line with the invention, the data communication in the inventive safety layer is designed such that a communication subscriber appears as the initiator of the data transmission and, at the start of a data transmission between the two communication subscribers, transmits an identification data packet to the other communication subscriber, the start value used for the check character for the identification data packet preferably being a fixed value or an identifier for the other communication subscriber. This practice can be used for reliably ensuring data interchange of safety-related data in the automation system following a break in communication. Preferably, a data item for identifying the other communication subscriber can also be used as identifier in the identification data packet sent in this case, which allows reliable and simple initialization of the communication link.

In line with the invention, at the start of a data transmission between the communication subscribers a further data item, preferably from the communication subscriber appearing as initiator of the data transmission, following the identification data packet, is transmitted to the other communication subscriber in another data packet. This further data item is a random session identifier or a session identifier which changes on the basis of a prescribed algorithm. The session identifier ensures that no repeating data packets emerge even after a break in the communication link and reinitialization.

In line with the invention, at the start of a data transmission between the communication subscribers, preferably the communication subscriber appearing as initiator of the data transmission transmits parameter data with a parameter data packet following the identification data packet and the session data packet to the other communication subscriber. This ensures that the operating parameters relating to the device functionality are also transmitted safely within the context of the safety layer. Another preference in this case is that the data packet be provided with a classification data item which identifies the data transmitted in the data packet.

In line with the invention, the calculation of the check character by the automation system takes account of the sequence number which identifies the respective message sequence of the data transmission between the two communication subscribers. In this context, the sequence number is preferably generated by the two communication subscribers separately from one another on the basis of a prescribed scheme. Including the sequence number in the calculation reliably ensures that the check character always changes when moving from one message sequence to the other. This prevents an identical check character from possibly being produced if successive data messages contain the same data, which could then result in a false alarm. In this case, the sequence number does not need to be transmitted in the data packets between the communication subscribers at the same time, since the communication subscribers can generate the sequence number separately from one another on the basis of a prescribed scheme. The sequence number can in this case be generated in the individual communication subscribers through incrementing or else through removal from a prescribed numbering block which both communication subscribers know, for example. Transmitting the sequence number between the communication subscribers would result in an unnecessarily long data packet, particularly if long sequence numbers are used to prevent the sequence numbers from overflowing during data communication.

In line with the invention, the data packets transmitted between the communication subscribers contain a connection identifier. This ensures that if a communication subscriber and various other communication subscribers transmit safety-related data packets then no transposition of the data packets occurs on account of a coincidentally identical check character from two data packets received by different communication subscribers.

The preceding description describes advantageous exemplary embodiments of the invention. The features disclosed therein and the claims and the drawings can, therefore, be useful for realizing the invention in its various embodiments, both individually and in any combination. While the foregoing is directed to embodiments of the present invention, other and further embodiments of this invention may be devised without departing from the basic scope of the invention, the scope of the present invention being determined by the claims that follow.

We claim:

1. A method of transmitting data packets on a data transmission link between two communication subscribers, wherein the data packets respectively contain a check character which is calculated from the other data in the data packet, wherein one communication subscriber uses the check character from the last data packet received by the other communication subscriber as start value for calculating the check character for a subsequent data packet which is to be sent to the other communication subscriber, and wherein a data packet received by one communication subscriber is identified as correct by calculating the check character for the received data packet and comparing it with the check character contained in the received data packet, the calculation being performed by taking the check character from the last data packet sent as start value.

2. The method as claimed in claim 1, wherein the data packet contains a classification data item which identifies the data transmitted with the data packet.

3. The method as claimed in claim 1, wherein one communication subscriber appears as the initiator of the data transmission and, at the start of a data transmission between the two communication subscribers, transmits an identification data packet containing an identifier to the other communication subscriber.

4. The method as claimed in claim 3, wherein the communication subscriber appearing as initiator of the data transmission uses a fixed value as start value for the check character for the identification data packet.

5. The method as claimed in claim 3, wherein the communication subscriber appearing as initiator of the data transmission uses an identifier for the other communication subscriber as start value for the check character for the identification data packet.

6. The method as claimed in claim 3, wherein the identification data packet sent by the communication subscriber appearing as initiator of the data transmission contains, as identifier, a data item for identifying the other communication subscriber.

7. The method as claimed in claim 3, wherein, at the start of a data transmission between the two communication subscribers, a random session identifier is transmitted as a further data item.

8. The method as claimed in claim 3, wherein, at the start of a data transmission between the two communication subscribers, a session identifier changing on the basis of a prescribed algorithm is transmitted as a further data item.

9. The method as claimed in claim 7, wherein the communication subscriber appearing as initiator of the data transmission transmits the session identifier to the other communication subscriber with a session data packet which follows the identification data packet.

10. The method as claimed in claim 8, wherein the communication subscriber appearing as initiator of the data transmission transmits the session identifier to the other communication subscriber with a session data packet which follows the identification data packet.

11. The method as claimed in claim 3, wherein parameter data are transmitted at the start of a data transmission between the two communication subscribers.

12. The method as claimed in claim 11, wherein the communication subscriber appearing as initiator of the data transmission transmits the parameter data to the other communication subscriber with at least one parameter data packet which follows the identification data packet and the session data packet.

13. The method as claimed in claim 1, wherein the data transmission link used is an Ethernet-based field bus.

14. The method as claimed in claim 1, wherein the calculation of the check character takes account of a sequence number which identifies the respective message sequence of the data transmission between the two communication subscribers.

15. The method as claimed in claim 14, wherein the two communication subscribers produce the sequence number identifying a message sequence separately from one another according to a prescribing scheme.

16. The method as claimed in claim 1, wherein the data packets transmitted between the two communication subscribers respectively contain a connection identifier.

17. A method of transmitting data packets on a data transmission link between two communication subscribers, wherein the data packets respectively contain a check character which is calculated from the other data in the data packet, wherein the calculation of the check character takes account of a sequence number which identifies the respective message sequence of the data transmission between the two communication subscribers, wherein one communication subscriber uses the check character from the last data packet received by the other communication subscriber as start value for calculating the check character for a subsequent data packet which is to be sent to the other communication subscriber, and wherein a data packet received by one communication subscriber is identified as correct by calculating the check character for the received data packet and comparing it with the check character contained in the received data packet, the calculation being performed by taking the check character from the last data packet sent as start value.

18. The method as claimed in claim 17, wherein the two communication subscribers produce the sequence number identifying a message sequence separately from one another according to a prescribing scheme.

19. The method as claimed in claim 17, wherein the data packet contains a classification data item which identifies the data transmitted with the data packet.

20. The method as claimed in claim 17, wherein one communication subscriber appears as the initiator of the data transmission and, at the start of a data transmission between the two communication subscribers, transmits an identification data packet containing an identifier to the other communication subscriber.

21. The method as claimed in claim 17, wherein the data transmission link used is an Ethernet-based field bus.

22. The method as claimed in claim 17, wherein the data packets transmitted between the two communication subscribers respectively contain a connection identifier.

23. A method of transmitting data packets on a data transmission link between two communication subscribers, wherein the data packets transmitted between the two communication subscribers respectively contain a connection identifier, wherein the data packets respectively contain a check character which is calculated from the other data in the data packet, wherein the calculation of the check character takes account of a sequence number which identifies the respective message sequence of the data transmission between the two communication subscribers, wherein one communication subscriber uses the check character from the last data packet received by the other communication subscriber as start value for calculating the check character for a subsequent data packet which is to be sent to the other communication subscriber, and wherein a data packet received by one communication subscriber is identified as correct by calculating the check character for the received data packet and comparing it with the check character contained in the received data packet, the calculation being performed by taking the check character from the last data packet sent as start value.

24. The method as claimed in claim 23, wherein the two communication subscribers produce the sequence number identifying a message sequence separately from one another according to a prescribing scheme.

25. The method as claimed in claim 23, wherein the data packet contains a classification data item which identifies the data transmitted with the data packet.

26. The method as claimed in claim 23, wherein one communication subscriber appears as the initiator of the data transmission and, at the start of a data transmission between the two communication subscribers, transmits an identification data packet containing an identifier to the other communication subscriber.

27. The method as claimed in claim 23, wherein the data transmission link used is an Ethernet-based field bus.

28. An automation system having two communication subscribers which are connected via a data transmission link and which respectively have an interface unit, each interface unit forming data packets with a check character calculated from the other data in the data packet, the start value for calculating the check character for a data packet which is to be sent to the other communication subscriber being the check character from the last data packet received by the other communication subscriber, wherein
the interface unit of the communication subscriber identifies a data packet received by the other communication subscriber as correct by calculating the check character for the received data packet and comparing it with the check character contained in the received data packet, the calculation being performed by taking the check character from the last data packet sent as start value.

29. The automation system as claimed in claim 28, wherein the interface unit of the communication subscriber provides the data packet with a classification data item which identifies the data transmitted with the data packet.

30. The automation system as claimed in claim 28, wherein one communication subscriber appears as the initiator of the data transmission, and its interface unit produces an identification data packet containing an identifier as the first data packet to be transmitted in a data transmission between the two communication subscribers.

31. The automation system as claimed in claim 30, wherein the interface unit of the communication subscriber appearing as initiator of the data transmission uses a fixed value as start value for the check character for the identification data packet.

32. The automation system as claimed in claim 30, wherein the interface unit of the communication subscriber appearing as initiator of the data transmission uses an identifier for the other communication subscriber as start value for the check character for the identification data packet.

33. The automation system as claimed in claim 30, wherein the identification data packet sent by the communication subscriber appearing as initiator of the data transmission contains, as identifier, a data item for identifying the other communication subscriber.

34. The automation system as claimed in claim 30, wherein the interface unit of the communication subscriber appearing as initiator of the data transmission produces, after the identification data packet, a session data packet which contains a random session identifier.

35. The automation system as claimed in claim 30, wherein the interface unit of the communication subscriber appearing as initiator of the data transmission produces, after the identification data packet, a session data packet which contains a session identifier which changes on the basis of a prescribed algorithm.

36. The automation system as claimed in claim 34, wherein the interface unit of the communication subscriber appearing as initiator of the data transmission produces, after the identification data packet and the session data packet, at least one parameter data packet which contains parameter data for the other communication subscriber.

37. The automation system as claimed in claim 35, wherein the interface unit of the communication subscriber appearing as initiator of the data transmission produces, after the identification data packet and the session data packet, at least one parameter data packet which contains parameter data for the other communication subscriber.

38. The automation system as claimed in claim 28, wherein the data transmission link is an Ethernet-based field bus.

39. The automation system as claimed in claim 28, wherein the interface unit of the communication subscriber takes account of a sequence number identifying the respective message sequence of the data transmission between the two communication subscribers when calculating the check character.

40. The automation system as claimed in claim 39, wherein the interface unit of the communication subscriber produces the sequence number identifying a message sequence on the basis of a prescribing scheme.

41. The automation system as claimed in claim 28, wherein the interface unit of the communication subscriber provides the data packet with a connection identifier.

42. An automation system having two communication subscribers which are connected via a data transmission link and which respectively have an interface unit, each interface unit forming data packets with a connection identifier, wherein
the interface unit of the communication subscriber forms data packets with a check character calculated from the other data in the data packet, the start value for calculating the check character for a data packet which is to be sent to the other communication subscriber being the check character from the last data packet received by the other communication subscriber, and wherein
the interface unit of the communication subscriber identifies a data packet received by the other communication subscriber as correct by calculating the check character for the received data packet and comparing it with the check character contained in the received data packet, the calculation being performed by taking the check character from the last data packet sent as start value.

43. The automation system as claimed in claim 42, wherein the interface unit of the communication subscriber provides the data packet with a classification data item which identifies the data transmitted with the data packet.

44. The automation system as claimed in claim 42, wherein one communication subscriber appears as the initiator of the data transmission, and its interface unit produces an identification data packet containing an identifier as the first data packet to be transmitted in a data transmission between the two communication subscribers.

45. The automation system as claimed in claim 44, wherein the interface unit of the communication subscriber appearing as initiator of the data transmission uses a fixed value as start value for the check character for the identification data packet.

46. The automation system as claimed in claim 42, wherein the data transmission link is an Ethernet-based field bus.

47. The automation system as claimed in claim 42, wherein the interface unit of the communication subscriber takes account of a sequence number identifying the respective message sequence of the data transmission between the two communication subscribers when calculating the check character.

48. The automation system as claimed in claim 47, wherein the interface unit of the communication subscriber produces the sequence number identifying a message sequence on the basis of a prescribing scheme.

\* \* \* \* \*